May 6, 1969  R. B. DUKE, JR., ET AL  3,442,931
PREPARATION OF 2,2-DISUBSTITUTED-1,3-PROPANEDIOL MONOESTERS
Filed June 11, 1965

ROY B. DUKE, JR.
MILTON A. PERRY
INVENTORS

BY R. Frank Smith
Cecil D. Quillen Jr.
ATTORNEYS

United States Patent Office 3,442,931
Patented May 6, 1969

3,442,931
PREPARATION OF 2,2-DISUBSTITUTED-1,3-PROPANEDIOL MONOESTERS
Roy B. Duke, Jr., Smyrna, Ga., and Milton A. Perry, Longview, Tex., assignors to Eastman Kodak Company, Rochester, N.Y., a corporation of New Jersey
Filed June 11, 1965, Ser. No. 463,298
Int. Cl. C07c 67/00
U.S. Cl. 260—468          10 Claims

ABSTRACT OF THE DISCLOSURE

A process for the preparation of 2,2-disubstituted-1,3-propanediol monoesters by condensing formaldehyde with an aldehyde having only one alpha-hydrogen atom in a 1:2 mole ratio in the presence of a strongly basic catalyst at temperatures below 50° C. The products of the process are well-known and valuable articles of commerce, for example, as intermediates in the production plasticizers.

---

This invention relates to a novel chemical process and more particularly to a novel process for preparing certain 2,2-disubstituted-1,3-propanediol monoesters.

The 2,2-disubstituted-1,3-propanediol monoesters are prepared in accordance with the process of the invention by condensing one mole of formalydehyde with two moles of an aldehyde having only one α-hydrogen atom. The process of our invention thus involves a mixed, trimeric aldehyde condensation and depends, in part, upon our discovery that formaldehyde and aldehydes having only one α-hydrogen atom, when contacted with a strongly basic catalyst at a temperature below 50° C., unexpectedly form a mixed aldehyde trimer, i.e., a 2,2-disubstituted-1,3-propanediol monoester.

The process of our invention can be illustrated by the following equation, showing the use of certain preferred reactants.

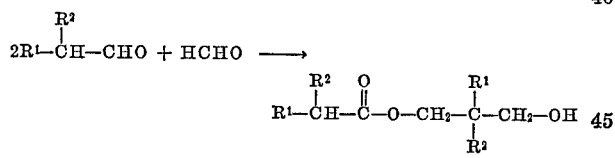

In the formulae of the above equation, each of $R^1$ and $R^2$, when taken singly, is alkyl and $R^1$ and $R^2$, when taken collectively with the carbon atom to which they are attached, represent an aliphatic carbocyclic group having 6 ring carbon atoms.

The catalysts which are useful in the process of our invention are strongly basic compounds containing an alkali metal or an alkaline earth metal. Among the useful basic catalysts are the alkoxides, hydroxides, carbonates, etc. of alkali metals or alkaline earth metals. When an alkoxide is employed as the catalyst, it is essential that the reaction be carried out under substantially anhydrous conditions whereas, when the catalyst is a hydroxide or a carbonate, aqueous solutions of the catalysts are generally employed.

Figure 1:
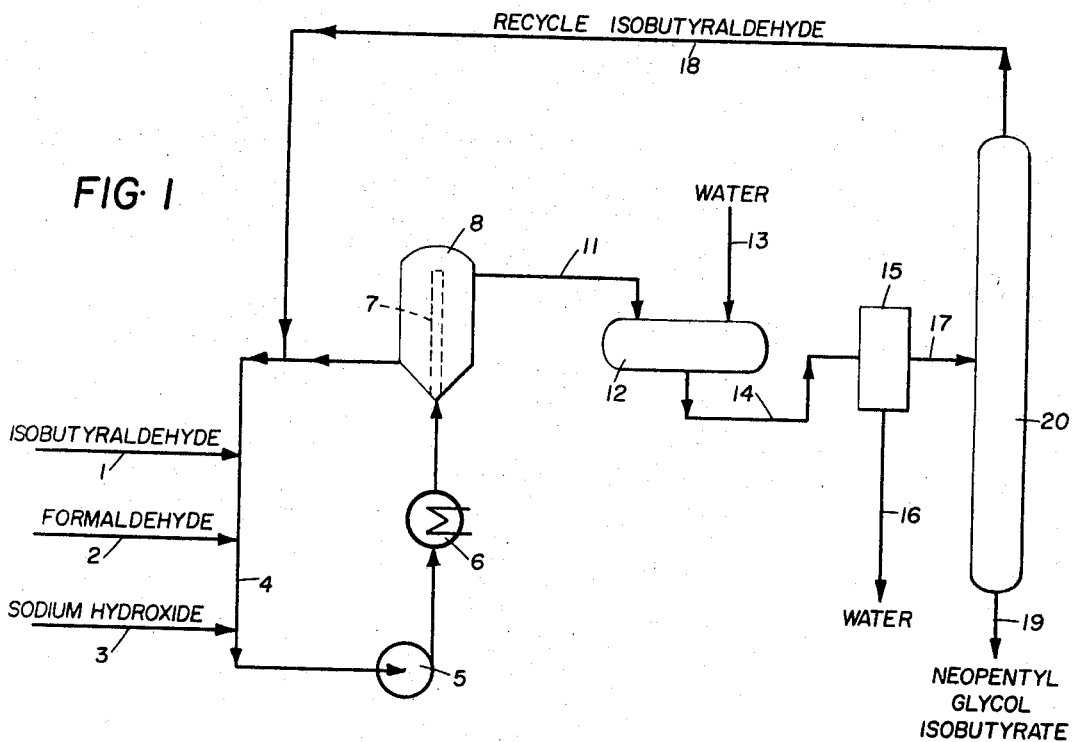

FIGURE 1 is a schematic flow diagram of a continuous embodiment of our process in which isobutyraldehyde is contacted with formaldehyde in the presence of sodium ethoxide to form neopentyl glycol monoisobutyrate, i.e., 2,2-dimethyl-1,3-propanediol, isobutyrate. Referring to FIGURE 1, isobutyraldehyde, and formaldehyde are introduced into circulating line 4 via lines 1 and 2, respectively. Sodium ethoxide, e.g., an ethanol solution of sodium ethoxide, is introduced into circulating line 4 via line 3 and the mixture containing isobutyraldehyde, formaldehyde and sodium ethoxide is forced by pump 5 through heat exchanger 6 and into reactor 8 via conduit 7. Heat exchanger 6 maintains the reaction temperature at below 50° C. The mixture is directed out of conduit 7 to splash against the top of reactor 8 to insure thorough mixing of the isobutyraldehyde, the formaldehyde and the sodium ethoxide. A portion of the reaction mixture is withdrawn through line 4 and recirculated through pump 5. The remainder of the reaction mixture is withdrawn via line 11 and passed into mixing tank 12. Water is introduced into tank 12 via line 13 and the water and reaction mixture are thoroughly mixed in order to decompose the sodium ethoxide. The mixture of water and crude reaction product is withdrawn from tank 12 via line 14 and passed to decanter 15. Water is removed from the bottom of decanter 15 and discarded via line 16 and the crude reaction product is overflowed from decanter 15 via line 17 to distillation column 20. Unreacted isobutyraldehyde is removed overhead from distillation column 20 and recycled to line 4 via line 18. Neopentyl glycol isobutyrate is removed from the base of column 20 via line 19. The neopentyl glycol isobutyrate can be further purified by additional distillation, if necessary.

Figure 2:
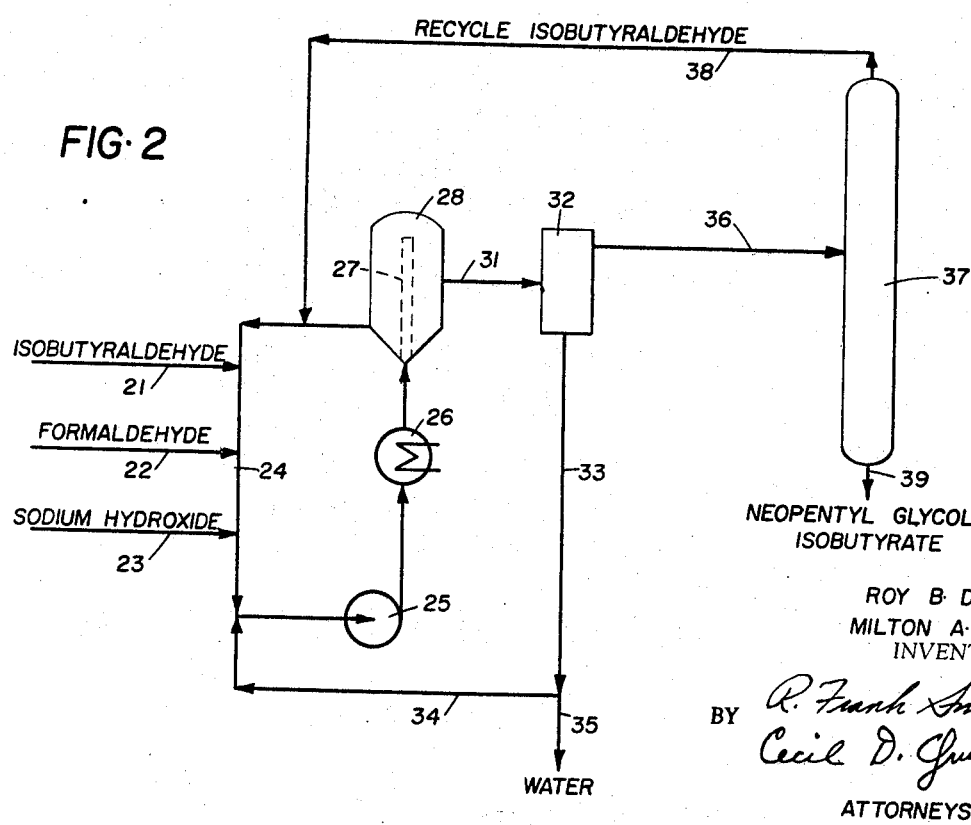

FIGURE 2 is a schematic flow diagram of a continuous embodiment of our process in which isobutyraldehyde is contacted with formaldehyde in the presence of an aqueous solution of sodium hydroxide to form neopentyl glycol monoisobutyrate. Referring to FIGURE 2, isobutyraldehyde and formaldehyde are introduced into circulating line 24 via lines 21 and 22. Sodium hydroxide, e.g., an aqueous solution of sodium hydroxide is introduced into line 24 via line 23 and the mixture of isobutyraldehyde, formaldehyde and sodium hydroxide is forced by pump 25 through heat exchanger 26. Heat exchanger 26 maintains the reaction mixture at a temperature below about 50° C. The mixture passes upward through conduit 27 and splashes against the top of reactor 28 with sufficient force to insure that the reactants and catalyst are thoroughly mixed. The reaction mixture is withdrawn from reactor 28 via line 31 and passed to decanter 32. The aqueous phase, which is separated in decanter 32, is removed via line 33. A portion of the aqueous phase is recycled to circulating line 24 via line 34 and the remainder is discarded via line 35. The water soluble salts of organic acids which are formed during the course of the reaction inhibit the formation of the desired mixed aldehyde trimer and should not be allowed to build up in the aqueous phase which is recycled. The rate at which the aqueous phase is discarded via line 35 is usually determined by the concentration of water soluble organic salts in the aqueous phase and should be sufficiently high to maintain the concentration of salts in the aqueous phase at less than 10% and preferably at less than 5% by weight. The organic phase separated in decanter 32 is passed to distillation column 37 via line 36. Isobutyraldehyde is removed overhead from distillation column 37 and recycled to circulating line 4 via line 38. Neopentyl glycol monoisobutyrate, removed from the base of column 37 by line 39 can be further purified, e.g., by further distillation, if desired.

Valuable processes for the production of glycol monoesters by the trimeric condensation of aldehydes having a single α-hydrogen atom are described in U.S. Patent 3,091,632 to Hagemeyer and Wright and in copending United States patent application Ser. No. 321,135 of Perry and Hagemeyer, filed Nov. 4, 1963. The processes described in the above patent and application are however for the production of trimers of a single aldehyde and do not relate to the production of mixed aldehyde trimers.

We have now unexpectedly discovered that mixed aldehyde trimers can be formed by contacting formaldehyde with an aldehyde having only one α-hydrogen atom in the presence of a strongly basic catalyst at a temperature below about 50° C. In accordance with the process of our invention we unexpectedly obtain a predominant amount of the mixed aldehyde trimer, i.e., the 2,2-disubstituted-1,3-propanediol monoester and only a minor amount of the trimer of the aldehyde having only one α-hydrogen atom.

As pointed out hereinbefore, the process of our invention is carried out by contacting formaldehyde with an aldehyde having only one α-hydrogen atom in the presence of a strongly basic compound as a catalyst. The strongly basic compounds which are useful are generally compounds containing an alkali or an alkaline earth metal. Among the useful basic catalysts are compounds such as sodium hydroxide, sodium carbonate, potassium hydroxide, potassium carbonate, lithium hydroxide, lithium carbonate, calcium hydroxide, magnesium hydroxide, lithium methoxide, sodium ethoxide, potassium isobutoxide, sodium methoxide, magnesium ethoxide, calcium isopropoxide, etc. Included among the useful alkoxide catalysts are complex metallic alkoxides such as magnesium aluminum ethoxide, calcium aluminum isopropoxide, sodium aluminum methoxide, etc.

The catalyst concentration in the reaction zone is generally maintained from about 0.005 to about 5 moles of alkali metal or alkaline earth metal per liter of reaction zone. Thus, when the reaction vessel in which the process of our invention is completely filled, the concentration of the alkali metal or alkaline earth metal is maintained at about 0.005 to about 5 moles per liter of reactor volume. If the reactor vessel is only partially filled, the concentration of the alkali metal or alkaline earth metal is maintained at about 0.005 to about 5 moles per liter within the portion of the reactor which is filled.

When the process of our invention is carried out with the catalyst dissolved in water, the reaction zone contains two liquid phases, i.e., an organic phase and an aqueous phase. The volume ratio of organic phase to aqueous phase is generally from about 90:10 to about 50:50 and is preferably from about 85:15 to about 75:25. Since substantially all of the basic catalyst present within the reaction zone is in the aqueous phase, the concentration of basic compound in the aqueous phase is necessarily higher than the average concentration within the reaction zone and generally ranges from about 0.01 molar up to the concentration of a saturated solution, e.g., about 10 molar at 0° C. for sodium hydroxide. The aqueous phase and organic phase must be intimately contacted with each other. The necessary intimate contacting can be accomplished by agitating or stirring the reaction mixture or, when the process is carried out continuously, by pumping the reaction mixture into the reactor at high velocity. The formaldehyde can be introduced into the reaction zone as an aqueous solution or as a slurry of paraldehyde in the aldehyde having a single α-hydrogen atom. Particularly preferred as basic catalysts when aqueous solutions are employed are the alkali metal and alkaline earth metal hydroxides.

When an alkoxide is employed as catalyst in the process of our invention, it is essential that the reaction medium be substantially anhydrous in order to avoid decomposition of the alkoxide catalyst. The formaldehyde can be introduced into the reaction zone as a slurry of paraformaldehyde in the aldehyde having a single α-hydrogen atom or as a solution in an inert solvent, e.g., an alkanol such as methanol, ethanol, etc. The preferred alkoxides for use as catalysts in the process of our invention are those prepared from alkanols having up to about 12 carbon atoms. Especially preferred alkoxides are those from lower alkanols, e.g., alkanols of up to about 4 carbon atoms.

The reactants and catalysts are contacted at temperatures below about 50° C. At higher temperatures, there is a pronounced tendency for the aldehyde having a single α-hydrogen atom to react with itself to form products other than the desired mixed trimer. Preferred reaction temperatures are below about 30° C.

As pointed out hereinbefore, the process of our invention involves the reaction of one mole of formaldehyde with two moles of an aldehyde having a single α-hydrogen atom. A stoichiometric excess of either formaldehyde or the aldehyde having a single α-hydrogen atom can be employed in accordance with the process of our invention. However, for reasons of economy, it is generally preferred to employ stoichiometric equivalents of the reactants.

Among the aldehydes having a single α-hydrogen atom which are useful in the process of our invention are compounds such as isobutyraldehyde, 2-methylbutyraldehyde, 2 - ethylbutyraldehyde, 2-methylpentaldehyde, 2-ethylpentaldehyde, 2-propylpentaldehyde, 2-methylhexaldehyde, 2-ethylhexaldehyde, 2-propylhexaldehyde, 2-butylhexaldehyde, 3-cyclohexene-1-carboxaldehyde, 2-methyl-3-cyclohexene-1-carboxaldehyde, 3-methyl-3-cyclohexene-1-carboxaldehyde, 4-methyl-3-cyclohexene-1-carboxaldehyde, 5-methyl-3-cyclohexene-1-carboxaldehyde, or 6-methyl-3-cyclohexene-1-carboxaldehyde, 2-ethyl-3-cyclohexene-1-carboxaldehyde, 3-ethyl-3-cyclohexene-1-carboxaldehyde, 4-ethyl-3-cyclohexene-1-carboxaldehyde, 5-ethyl-3-cyclohexene-1-carboxaldehyde, or 6-ethyl-3-cyclohexene - 1-carboxaldehyde, 3-chloro-3-cyclohexene-1-carboxaldehyde, and/or 4-chloro-3-cyclohexene-1-carboxaldehyde, 2-ethoxy-3-cyclohexene-1-carboxaldehyde, etc.

The following examples illustrates the process of the invention.

EXAMPLE 1

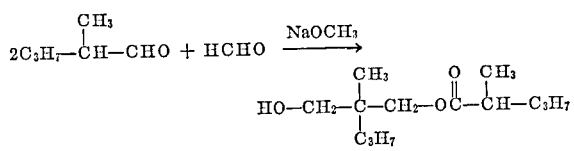

Nine moles of 2-methylpentanal were added with good mixing to an alcoholic solution of formaldehyde (3 moles) containing 10 g. of sodium (as sodium methoxide). The 2-methyl pentanal was added over a 1-hour period. An additional 3 hours of contact was allowed to complete the reaction. The temperature was controlled between 10 and 25° C. At the termination of the reaction period, the mixture was diluted with water, neutralized with a dilute mineral acid and then washed several times with water. The product was subsequently vacuum distilled yielding 2-methyl-2-propyl-3-hydroxypropyl 2-methylpentanoate.

EXAMPLE 2

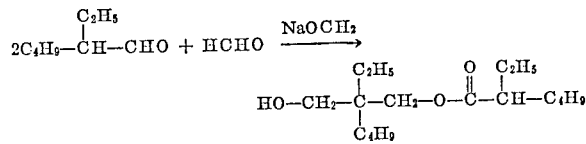

2-ethylhexanal is reacted with formaldehyde, as described in Example 1, to yield 2-ethyl-2-butyl-3-hydroxypropyl 2-ethylhexanoate.

EXAMPLE 3

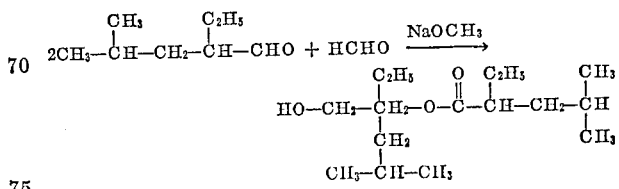

2-ethylisohexanal is reacted with formaldehyde, as described in Example 1, to yield 2-ethyl-2-isobutyl-3-hydroxypropyl 2-ethylisohexanoate.

EXAMPLE 4

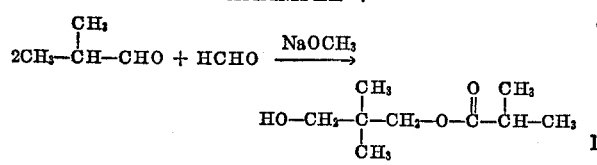

Isobutyraldehyde is reacted with formaldehyde, as described in Example 1, yielding hydroxyneopentyl isobutyrate.

EXAMPLE 5

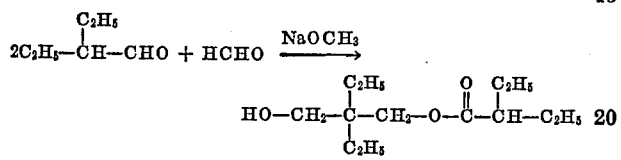

2-ethylbutyraldehyde is reacted with formaldehyde, as described in Example 1, to yield 2,2-diethyl-3-hydroxypropyl-2-ethylbutyrate.

EXAMPLE 6

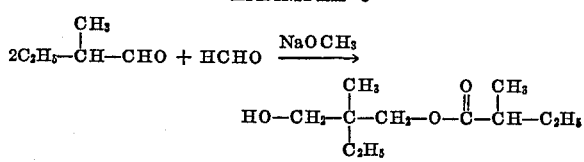

2-methylbutyraldehyde was reacted with formaldehyde as described in Example 1, yielding 2-methyl-2-ethyl-3-hydroxypropyl 2-methylbutyrate.

EXAMPLE 7

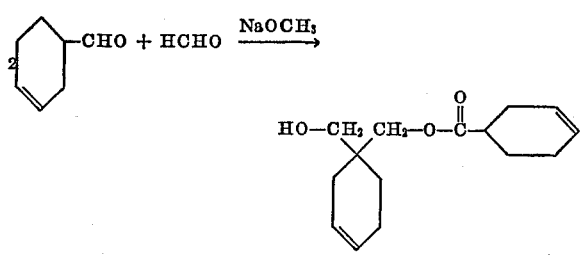

3-cyclohexene-1-carboxaldehyde (2 moles), formed by the reaction of butadiene with acrolein, was added to an anhydrous methanolic solution of formaldehyde containing 5% sodium methoxide as catalyst. The temperature was controlled between 0° C. and 30° C. during a 4-hour reaction period. The reaction product was washed to remove the catalyst and subsequently distilled yielding, 1,1-dihydroxymethyl-3-cyclohexene 3-cyclohexene-1-carboxylate (78%).

EXAMPLE 8

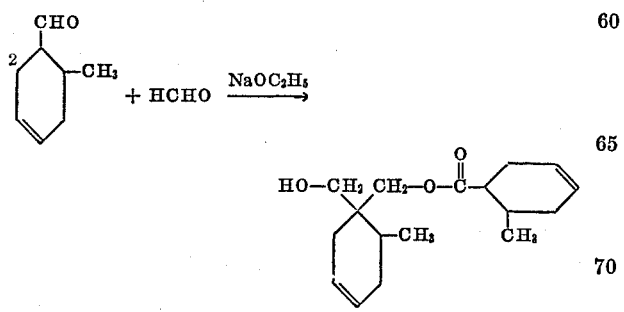

6-methyl-3-cyclohexene-2-carboxaldehyde (2 moles), formed by the Diels-Alder condensation of butadiene with crotonaldehyde, was added to an anhydrous ethanolic solution of formaldehyde (1 mole) containing 5% sodium ethoxide as catalyst. The temperature was controlled between 0° C. and 30° C. during a 6-hour reaction period. The reaction product was washed with water to yield 1,1 - dihydroxymethyl - 6 - methyl - 3 - cyclohexene 6-methyl-3-cyclohexene-1-carboxylate (72%).

EXAMPLE 9

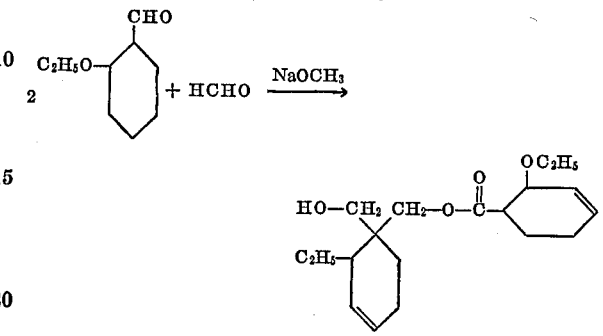

2-ethoxy-3-cyclohexene-1-carboxaldehyde, formed by the reaction of 1-ethoxy butadiene and acrolein (2 moles), was added to anhydrous methanolic formaldehyde (1 mole) containing 5% sodium methoxide catalyst. The temperature was controlled between 0° C. and 30° C. during a reaction period of 6 hours. The reaction product was subsequently washed with water to remove the catalyst and then distilled yielding 1,1-dihydroxymethyl-2-ethoxy - 3 - cyclohexene 2 - ethoxy - 3 - cyclohexene - 1-carboxylate (69%).

EXAMPLE 10

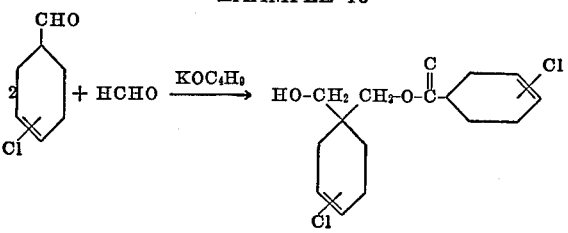

A mixture of 3-chloro-3-cyclohexene-1-carboxaldehyde and 4-chloro-3-cyclohexene-1-carboxaldehyde (2 moles), formed by the Diels-Alder condensation of 2-chlorobutadiene (chloroprene) with acrolein, was added to an anhydrous alcoholic solution of formaldehyde containing 5% potassium tertiary butoxide as catalyst. The temperature was controlled between 0° C. and 30° C. during an 8-hour period. The reaction product was washed with water to remove the catalyst and the glycol monoester subsequently distilled yielding a mixture of 1,1 - dihydroxymethyl - 3 - chloro - 3 - cyclohexene 3-chloro-3-cyclohexene-1-carboxylate; 1,1-dihydroxymethyl-3-chloro-3-cyclohexene 4-chloro-3-cyclohexene-1-carboxylate; 1,1 - dihydroxymethyl - 4 - chloro - 3 - cyclohexene 3-chloro-3-cyclohexene-1-carboxylate; and 1,1-dihydroxymethyl - 4 - chloro - 3 - cyclohexene 4 - chloro-3-cyclohexene-1-carboxylate in 62% yield.

EXAMPLE 11

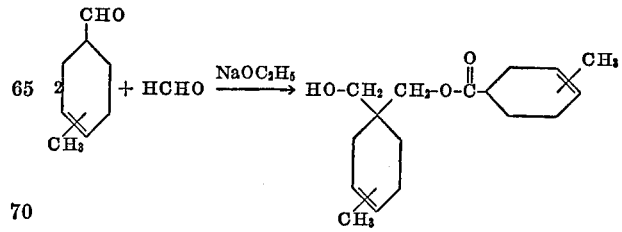

A mixture of 3-methyl-3-cyclohexene-1-carboxaldehyde and 4-methyl-3-cyclohexen-1-carboxaldehyde (2 moles), formed by the Diels-Alder condensation of isoprene with acrolein, was added to an alcoholic solution of formaldehyde (1 mole) containing 5% sodium ethoxide as catalyst. The temperature was controlled between 0° C. and 50° C. during a 4-hour reaction period. The reaction product was washed to remove the catalyst and the glycol monoester subsequently distilled yielding a mixture of 1,1-dihydroxy-3-methyl-cyclohexene 3-methyl - 3 - cyclohexene - 1 - carboxylate; 1,1 - dihydroxymethyl - 3 - methyl - 3 - cyclohexene - 4 - methyl - 3 - cyclohexene - 1 - carboxylate; 1,1 - dihydroxymethyl - 4 - methyl - 3 - cyclohexene - 3 - methyl - 3 - cyclohexene - 1 - carboxylate; and 1,1 - dihydroxymethyl - 4 - methyl-3-cyclohexene - 4 - methyl-3-cyclohexene-1-carboxylate in 72% yield.

As can be seen, we have provided a process involving a novel combination of reactants, reaction conditions and catalysts which unexpectedly produce certain 2,2-disubstituted-1,3-propanediol monoesters in yields exceeding about 50 percent.

Although the invention has been described in considerable detail with particular reference to certain preferred embodiments thereof, it will be understoood that variations and modifications can be effected within the spirit and scope of the invention as described hereinabove and as defined in the appended claims.

We claim:

1. The process which comprises contacting formaldehyde with an aldehyde of the formula:

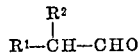

in a 1:2 mole ratio in the presence of a dissolved basic catalyst at a temperature below about 50° C. and obtaining a glycol monoester of the formula:

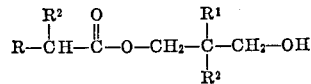

wherein each of $R^1$ and $R^2$, when taken singly, is alkyl and $R^1$ and $R^2$, when taken collectively wtih the carbon atom to which they are attached, represent an aliphatic carbocyclic group having 6 ring carbon atoms.

2. The process of claim 1 in which the dissolved basic catalyst is a basic compound containing a metal selected from the group consisting of: (a) alkali metals, and (b) alkaline earth metals.

3. The process which comprises contacting formaldehyde with an aldehyde of the formula:

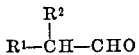

in a 1:2 mole ratio in the presence of a dissolved basic compound containing a metal selected from the group consisting of: (a) alkali metals, and (b) alkaline earth metals at a temperature below about 50° C. and obtaining a glycol monoester of the formula:

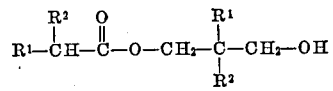

wherein each of $R^1$ and $R^2$, when taken singly, is alkyl of up to about 8 carbon atoms and $R^1$ and $R^2$, when taken collectively with the carbon atom to which they are attached, represent an aliphatic carbocyclic group having 6 ring carbon atoms.

4. The process which comprises contacting formaldehyde with an aldehyde of the formula:

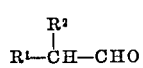

in the presence of an aqueous solution of a basic compound containing a metal selected from the group consisting of: (a) alkali metals, and (b) alkaline earth metals at a temperature below about 50° C. and containing a glycol monoester of the formula:

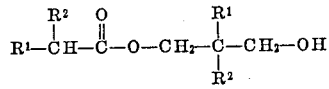

wherein each of $R^1$ and $R^2$, when taken singly, is alkyl of up to about 8 carbon atoms, and $R^1$ and $R^2$, when taken collectively with the carbon atom to which they are attached, represent an aliphatic carbocyclic group having 6 ring carbon atoms.

5. The process which comprises contacting formaldehyde with an aldehyde of the formula:

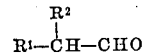

in a 1:2 mole ratio in the presence of a solution of an alkoxide of a metal selected from the group consisting of: (a) alkali metals, and (b) alkaline earth metals at a temperature below about 50° C. and obtaining a glycol monoester of the formula:

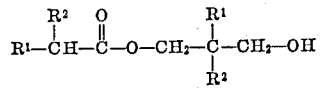

wherein each of $R^1$ and $R^2$, when taken singly, is alkyl of up to about 8 carbon atoms and $R^1$ and $R^2$, when taken collectively with the carbon atom to which they are attached, represent an aliphatic carbocyclic group having 6 ring carbon atoms.

6. The process which comprises contacting formaldehyde with isobutyraldehyde in a 1:2 mole ratio in the presence of a dissolved basic compound containing a metal selected from the group consisting of: (a) alkali metals, and (b) alkaline earth metals at a temperature below about 30° C. and obtaining neopentyl glycol monoisobutyrate.

7. The process which comprises contacting formaldehyde with 2-ethylhexanal in a 1:2 mole ratio in the presence of a dissolved basic compound containing a metal selected from the group consisting of: (a) alkali metals, and (b) alkaline earth metals at a temperature below about 30° C. and obtaining 2-ethyl-2-butyl-3-hydroxypropyl 2-ethylhexanoate.

8. The process which comprises contacting formaldehyde with 2-ethylisohexanal in a 1:2 mole ratio in the presence of a dissolved basic compound containing a metal selected from the group consisting of: (a) alkali metals, and (b) alkaline earth metals at a temperature below 30° C. and obtaining 2-ethyl-2-isobutyl-3-hydroxypropyl 2-ethyl isohexanoate.

9. The process which comprises contacting formaldehyde with 2-methylpentanal in a 1:2 mole ratio in the presence of a dissolved basic compound containing a metal selected from the group consisting of: (a) alkali metals, and (b) alkaline earth metals at a temperature below about 30° C. and obtaining 2-methyl-2-propyl 3-hydroxypropyl 2-methyl pentanoate.

10. The process which comprises contacting formaldehyde with 3-cyclohexene-1-carboxaldehyde in a 1:2- mole ratio in the presence of a dissolved basic compound containing a metal selected from the group consisting of: (a) alkali metals, and (b) alkaline earth metals at a temperature below about 30° C. and obtaining 1,1-dihydroxymethyl-3-cyclohexane 3-cyclohexene-1-carboxylate.

References Cited

Wessely: Monatsh. Fur Chemie, vol. 21, pp. 216–234 (1900).

Wessely: Monatsh. Fur Chemie, vol. 22, pp 66–68 (1901).

LORRAINE A. WEINBERGER, *Primary Examiner.*

P. J. KILLOS, *Assistant Examiner.*

U.S. Cl. X.R.

260—494, 598